(12) United States Patent
Pocklington et al.

(10) Patent No.: US 8,949,628 B2
(45) Date of Patent: Feb. 3, 2015

(54) POWER-ALLOCATION INTERFACE

(75) Inventors: Richard Pocklington, Burlington (CA); Anthony Russello, Hamilton (CA)

(73) Assignee: Z124, George Town (KY)

( * ) Notice: Subject to any disclaimer, the term of this patent is extended or adjusted under 35 U.S.C. 154(b) by 1000 days.

(21) Appl. No.: 13/036,838

(22) Filed: Feb. 28, 2011

(65) Prior Publication Data

US 2012/0221868 A1    Aug. 30, 2012

(51) Int. Cl.
*G06F 1/26*    (2006.01)
*G06F 1/32*    (2006.01)

(52) U.S. Cl.
CPC .............. *G06F 1/266* (2013.01); *G06F 1/3234* (2013.01); *G06F 1/329* (2013.01)
USPC .......................................... 713/300; 455/573

(58) Field of Classification Search
CPC ....... H04B 1/406; G06F 1/3203; H01M 10/44
USPC ............ 455/573; 713/300; 320/135; 709/213
See application file for complete search history.

(56) References Cited

U.S. PATENT DOCUMENTS

| | | | |
|---|---|---|---|
| 7,057,372 B2 | 6/2006 | Chen et al. | |
| 7,627,343 B2 | 12/2009 | Fadell et al. | |
| 7,719,830 B2 | 5/2010 | Howarth et al. | |
| 7,873,852 B2 | 1/2011 | Bell | |
| 7,876,852 B2 | 1/2011 | Schimpe | |
| 2008/0307243 A1 | 12/2008 | Lee | |
| 2009/0013204 A1 | 1/2009 | Kobayashi et al. | |
| 2009/0278806 A1 | 11/2009 | Duarte et al. | |
| 2012/0047379 A1 | 2/2012 | Chen et al. | |
| 2012/0081267 A1 | 4/2012 | Sirpal et al. | |
| 2012/0081268 A1 | 4/2012 | Sirpal et al. | |
| 2012/0081269 A1 | 4/2012 | de Paz | |
| 2012/0081270 A1 | 4/2012 | Gimpl et al. | |
| 2012/0081271 A1 | 4/2012 | Gimpl et al. | |
| 2012/0081280 A1 | 4/2012 | Schrock et al. | |
| 2012/0081289 A1 | 4/2012 | Sirpal et al. | |
| 2012/0081292 A1 | 4/2012 | Sirpal et al. | |
| 2012/0081293 A1 | 4/2012 | Sirpal et al. | |
| 2012/0081302 A1 | 4/2012 | Gimpl et al. | |
| 2012/0081303 A1 | 4/2012 | Cassar et al. | |
| 2012/0081304 A1 | 4/2012 | Sirpal et al. | |
| 2012/0081305 A1 | 4/2012 | Schrock | |
| 2012/0081306 A1 | 4/2012 | Sirpal et al. | |
| 2012/0081307 A1 | 4/2012 | Sirpal et al. | |
| 2012/0081308 A1 | 4/2012 | Sirpal | |

(Continued)

OTHER PUBLICATIONS

Google Image Result Fujitsu Dual Screen Phone, published date unknown, [retrieved Apr. 18, 2011], 1 page. Retrieved from: www.google.com/imgres?imgurl=http://www.computerriver.com/images/dual-screen-phone.jpg.

(Continued)

*Primary Examiner* — Phuoc H Doan
(74) *Attorney, Agent, or Firm* — Sheridan Ross P.C.

(57) ABSTRACT

Management of battery resources of an electronic device are disclosed. The electronic device has a battery, a display in communication with the battery, multiple subsystems in communication with the battery, and a user interface in communication with the subsystems. On the display is presented an indication of usage of the battery resources by the subsystems in executing functions by the device. With the interface, a user directive is received to reallocate the usage of the battery resources. The usage of the battery resources are thus reallocated in accordance with the user directive.

24 Claims, 8 Drawing Sheets

(56) References Cited

U.S. PATENT DOCUMENTS

| | | |
|---|---|---|
| 2012/0081309 A1 | 4/2012 | Sirpal et al. |
| 2012/0081310 A1 | 4/2012 | Schrock |
| 2012/0081311 A1 | 4/2012 | Sirpal et al. |
| 2012/0081312 A1 | 4/2012 | Sirpal et al. |
| 2012/0081313 A1 | 4/2012 | Sirpal et al. |
| 2012/0081314 A1 | 4/2012 | Sirpal et al. |
| 2012/0081315 A1 | 4/2012 | Sirpal |
| 2012/0081316 A1 | 4/2012 | Sirpal et al. |
| 2012/0081317 A1 | 4/2012 | Sirpal et al. |
| 2012/0081318 A1 | 4/2012 | Sirpal et al. |
| 2012/0081319 A1 | 4/2012 | Gimpl et al. |
| 2012/0081322 A1 | 4/2012 | Sirpal et al. |
| 2012/0081323 A1 | 4/2012 | Sirpal et al. |
| 2012/0081397 A1 | 4/2012 | de Paz |
| 2012/0081398 A1 | 4/2012 | Sirpal et al. |
| 2012/0081399 A1 | 4/2012 | Sirpal et al. |
| 2012/0081400 A1 | 4/2012 | Schrock et al. |
| 2012/0081401 A1 | 4/2012 | Sirpal et al. |
| 2012/0081403 A1 | 4/2012 | Sirpal et al. |
| 2012/0081854 A1 | 4/2012 | Sirpal et al. |
| 2012/0083319 A1 | 4/2012 | Sirpal et al. |
| 2012/0084673 A1 | 4/2012 | Sirpal et al. |
| 2012/0084674 A1 | 4/2012 | Visosky |
| 2012/0084675 A1 | 4/2012 | Sirpal et al. |
| 2012/0084676 A1 | 4/2012 | de Paz |
| 2012/0084677 A1 | 4/2012 | Sirpal et al. |
| 2012/0084678 A1 | 4/2012 | Sirpal et al. |
| 2012/0084679 A1 | 4/2012 | Sirpal et al. |
| 2012/0084680 A1 | 4/2012 | Gimpl et al. |
| 2012/0084681 A1 | 4/2012 | Cassar |
| 2012/0084682 A1 | 4/2012 | Sirpal et al. |
| 2012/0084686 A1 | 4/2012 | Sirpal et al. |
| 2012/0084687 A1 | 4/2012 | Sirpal et al. |
| 2012/0084693 A1 | 4/2012 | Sirpal et al. |
| 2012/0084694 A1 | 4/2012 | Sirpal et al. |
| 2012/0084698 A1 | 4/2012 | Sirpal et al. |
| 2012/0084699 A1 | 4/2012 | Sirpal et al. |
| 2012/0084700 A1 | 4/2012 | Sirpal et al. |
| 2012/0084701 A1 | 4/2012 | Sirpal et al. |
| 2012/0084706 A1 | 4/2012 | Sirpal et al. |
| 2012/0084709 A1 | 4/2012 | Sirpal |
| 2012/0084710 A1 | 4/2012 | Sirpal et al. |
| 2012/0084712 A1 | 4/2012 | Gimpl et al. |
| 2012/0084714 A1 | 4/2012 | Sirpal et al. |
| 2012/0084715 A1 | 4/2012 | Sirpal et al. |
| 2012/0084716 A1 | 4/2012 | Sirpal et al. |
| 2012/0084718 A1 | 4/2012 | Gimpl et al. |
| 2012/0084719 A1 | 4/2012 | Sirpal et al. |
| 2012/0084720 A1 | 4/2012 | Sirpal et al. |
| 2012/0084721 A1 | 4/2012 | Gimpl et al. |
| 2012/0084722 A1 | 4/2012 | Cassar et al. |
| 2012/0084723 A1 | 4/2012 | Reeves et al. |
| 2012/0084724 A1 | 4/2012 | Sirpal et al. |
| 2012/0084725 A1 | 4/2012 | Sirpal et al. |
| 2012/0084726 A1 | 4/2012 | Sirpal et al. |
| 2012/0084727 A1 | 4/2012 | Sirpal et al. |
| 2012/0084739 A1 | 4/2012 | Sirpal et al. |
| 2012/0105363 A1 | 5/2012 | Sirpal et al. |
| 2012/0110486 A1 | 5/2012 | Sirpal et al. |
| 2012/0110497 A1 | 5/2012 | Gimpl et al. |
| 2012/0117495 A1 | 5/2012 | Sirpal et al. |
| 2012/0124490 A1 | 5/2012 | Sirpal et al. |
| 2012/0144323 A1 | 6/2012 | Sirpal et al. |
| 2012/0174028 A1 | 7/2012 | Sirpal et al. |
| 2012/0210150 A1* | 8/2012 | de Lind van Wijngaarden et al. ........ 713/320 |
| 2012/0221878 A1 | 8/2012 | Pocklington et al. |
| 2013/0078994 A1 | 3/2013 | Jouin |
| 2013/0078995 A1 | 3/2013 | Jouin |
| 2013/0079054 A1 | 3/2013 | Jouin |
| 2013/0086293 A1 | 4/2013 | Bosse et al. |

OTHER PUBLICATIONS

Google Image Result for LG Dual Touch Screen Concept Phone by Eugene Kim, published date unknown, [retrieved Apr. 18, 2011], 1 page. Retrieved from: www.google.com/imgres?imgurl=http://fgadgets.com/wp-content/uploads/2010/08/lg-dual-touch-screen-phone-Eugene-Kim-01.jpg.

Google Image Result for Fujitsu Dual Screen Phone, published date unknown, [retrieved Apr. 18, 2011], 1 page. Retrieved from: www.google.com/imgres?imgurl=http://www.gsmdome.com/wp-content/uploads/2010/10/fujitsu-dual-screen-phone_w2cP7_54.jpg.

Google Image Result for Kyocera Echo, published date unknown, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg.

Google Image Result for HTC Triple Viper, published date unknown, [retrieved Apr. 18, 2011], 1 page. Retrieved from:www.google.com/imgres?imgurl=http://www.santafemods.com/Forum/AndroidForums/htcTripleViper.png.

Google Image Result for Dual-Screen Phone, [retrieved Apr. 18, 2011], 1 page. Retrieved from: www.google.com/imgres?imgurl=http://www.netshet.org/wp-content/uploads/2011/02/Dual-Scree . . . .

"Malloc—a memory allocator," The Open Group Base Specifications, 2008, Issue 7, 2 pages, retrieved from www.opengroup.org/onlinepubs/9699919799/functions/malloc.html.

Website entitled "Lapdock™ for Motorola Atrix," Motorola Mobility, Inc, 2011, [retrieved on Apr. 18, 2011], 1 page. Retrieved from: www.motorola.com/Consumers/US-EN/Consumer-Product-and-Services/Mobile+Ph . . . .

Website entitled, "Juice pack air™ for iPhone 4," Mophie, 2010, [retrieved on Mar. 1, 2013], 3 pages. Retrieved from: www.web.archive.org/web/20101011165412/http://www.mophie.com/mophie-juice-pack-air-iPhone-4-battery-case-p/1145_jpaxp4.html.

Website entitled "Motorola Atrix 4G Laptop Dock Review," phoneArena.com, posted Mar. 2, 2011, [retrieved on Apr. 18, 2011], 6 pages. Retrieved from: www.phonearena.com/reviews/Motorola-ATRIX-4G-Laptop-Dock-Review_id2667.

Wikipedia, "C dynamic memory allocation," Nov. 7, 2009, [retrieved on Mar. 4, 2013], 6 pages, retrieved from: www.en.wikipedia.org/w/index.php?title=Windows_Task_Manager&oldid=324387462.

Wikipedia, "Malloc," Mar. 30, 2011, 13 pages, retrieved from: www.en.wikipedia.org/wiki/Malloc.

Wikipedia, "Windows Task Manager," May 8, 2009, [retrieved on Mar. 4, 2013], 9 pages, retrieved from: www.en.wikipedia.org/w/index.php?title=C_dynamic_memory_allocation&oldid=288701334.

Burns, "Motorola Atrix 4G Laptop Dock Review," Android Community, Feb. 20, 2011, [retrieved on Apr. 18, 2011], 5 pages. Retrieved from: www.androidcommunity.com/motorola-atrix-4g-laptop-dock-review-20110220/.

Catacchio, "This smartphone has two huge screens . . . that rotate," The Next Web, Inc., Oct. 7, 2010, [retrieved on Jul. 21, 2011], 2 pages. Retrieved from: www.thenextweb.com/asia/2010/10/07/this-smartphone-has-two-huge-screens-that-rotate/.

Posted by Harman03, "Kyocera Echo Dual-screen Android Phone," posted 4 weeks from Apr. 18, 2011, [retrieved on Apr. 18, 2011], 3 pages. Retrieved from: www.unp.me/f106/kyocera-echo-dual-screen-android-phone-143800/.

Stein, "How does the Motorola Atrix 4G Lapdock compare with a laptop?" Crave—CNET, Feb. 9, 2011 [retrieved on Apr. 18, 2011], 7 pages. Retrieved from: www.news.cnet.com/8301-17938_105-20031251-1.html.

Official Action for U.S. Appl. No. 13/036,659, mailed Nov. 6, 2012, 21 pages.

U.S. Appl. No. 13/843,195, filed Mar. 15, 2013, Flynn.

Final Action for U.S. Appl. No. 13/036,659, mailed Apr. 3, 2013, 9 pages.

Notice of Allowance for U.S. Appl. No. 13/036,659, mailed Sep. 25, 2013, 8 pages.

* cited by examiner

| Function | Power Draw |
|----------|------------|
| Phone | 34% |
| Web Browser | 66% |

Total Time Remaining: 2:38:27  — 460

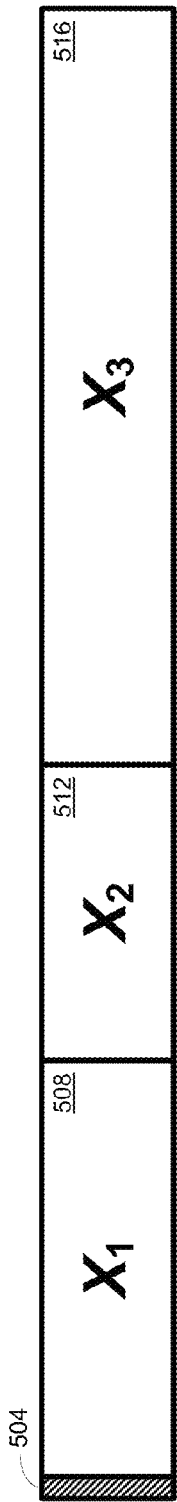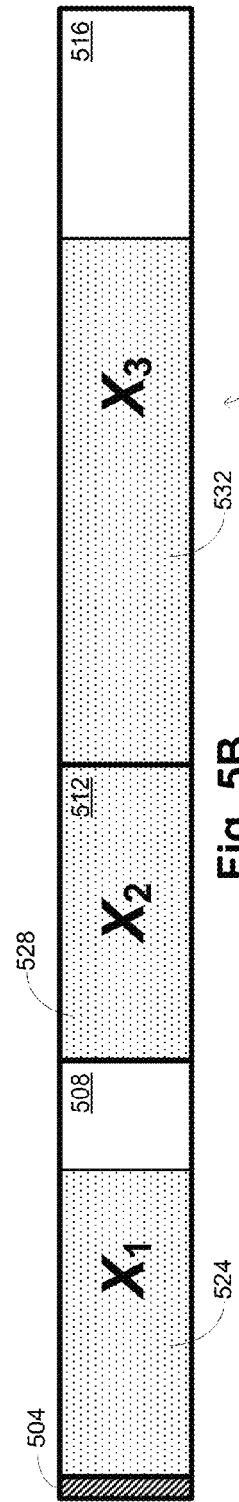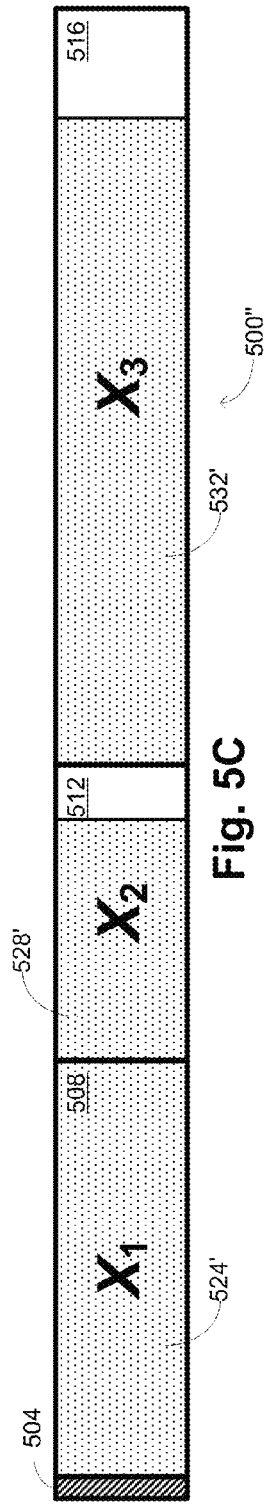

POWER-ALLOCATION INTERFACE

CROSS REFERENCE TO RELATED APPLICATION

This application is being filed concurrently with commonly assigned U.S. patent application Ser. No. 13/036,659, now U.S. Pat. No. 8,677,168, entitled "POWER ALLOCATION IN DEVICES", the entire disclosure of which is incorporated herein by reference for all purposes ("the related application").

BACKGROUND OF THE INVENTION

This application relates generally to power systems. More specifically, this application relates to power allocation in devices, such as electronic communication devices.

There are increasingly many types of mobile communications devices available to consumers, including mobile telephones, smart phones, pagers, wireless Internet appliances, and others. While power supply is a concern with almost all electronic devices, it is of particular relevance to mobile communications devices that necessarily include a power supply within a relatively small housing. Such power supplies currently take the form of a rechargeable battery, which is drawn on by any number of subsystems within the device depending on how the device is used. For instance, a typical mobile communications device may include input/output circuits, wireless communication circuits, camera circuits, global-positioning-system circuits, accelerometer circuits, among others, as will as a variety of processing circuits to support voice-communication, data-transfer, and other functionality. The various subsystems of the device may support a number of different functions, with the power requirements of the specific subsystems involved with each function perhaps varying according to the particular requirements of the functions.

Current power-management systems for mobile communications devices typically provide visual indicators of an overall remaining battery charge in the device. In some cases, the devices may also be equipped to issue a sound when battery charge is below a certain level. Such indicators are useful for users of the devices, but are very limited in the way they manage power. Solely on the basis of a single global indicator, the user is left to determine which functions might still be useable before the battery is recharged. Those determinations frequently involve a high level of guesswork by users, who must attempt to estimate when the battery will ultimately be depleted of charge. Often, a user will attempt to use some function of the device only to discover while using the function that there was insufficient power to complete the function, resulting in unexpectedly dropped calls, unexpected interruptions in data transmission, or other premature terminations of functionality.

There is accordingly a need in the art for improved methods and systems of managing power allocations in such devices.

SUMMARY

Embodiments of the invention provide methods of managing battery resources of an electronic device. The electronic device has a battery, a display in communication with the battery, a plurality of device subsystems in communication with the battery, and a user interface in communication with the plurality of device subsystems. On the display is presented an indication of usage of the battery resources by the plurality of subsystems in executing a plurality of functions by the device. With the interface, a user directive is received to reallocate the usage of the battery resources. The usage of the battery resources are thus reallocated in accordance with the user directive.

In some of these embodiments, the indication of usage of the battery resources comprises an estimated time to depletion of the battery resources. An estimated time to depletion of the battery resources by executing a second plurality of functions different from the plurality of functions may also be presented. In other embodiments, the indication of usage of the battery resources may comprise an indication of relative usage of the battery resources separately by each of the plurality of functions.

The user directive may comprise a user directive to terminate execution of at least one of the plurality of functions. In such embodiments, the usage of the battery resources may accordingly comprise terminating execution of the at least one of the plurality of functions. The usage of the battery resources may then comprise identifying unused portions of the battery resources allocated to the at least one of the plurality of functions, deallocating the identified portions, and allocating the deallocated portions to at least one other of the plurality of functions.

Reallocating the usage of the battery resources may comprise defining a time limit for execution for at least one of the plurality of functions. In different embodiments, usage of the battery resources may be in accordance with a static allocation of battery resources or in accordance with a dynamic allocation of battery resources.

The methods of the invention may be embodied in an electronic device that comprises a processor, a battery, a display in communication with the battery and the processor, a plurality of device subsystems in communication with the battery and the processor, and a user interface in communication with the processor and with the plurality of device subsystems. The processor includes instructions, such as in the form of computer-readable code, to implement the methods of the invention.

BRIEF DESCRIPTION OF THE DRAWINGS

A further understanding of the nature and advantages of the present invention may be realized by reference to the remaining portions of the specification and the drawings, wherein like reference labels are used throughout the several drawings to refer to similar components.

FIGS. 5A-5C provide schematic illustrations of power allocation in mobile devices as part of implementing the methods of FIG. 3.

DETAILED DESCRIPTION OF EXEMPLARY EMBODIMENTS

Embodiments of the invention provide methods and systems for managing power allocation in devices. While much of the description herein makes reference to mobile electronic devices or even more specifically to mobile communications devices, this is to highlight the particular utility of the invention to managing power allocation in such devices. More generally, though, the methods and systems of the invention may find application in a wide variety of devices that have power-management requirements.

Figure 1A:
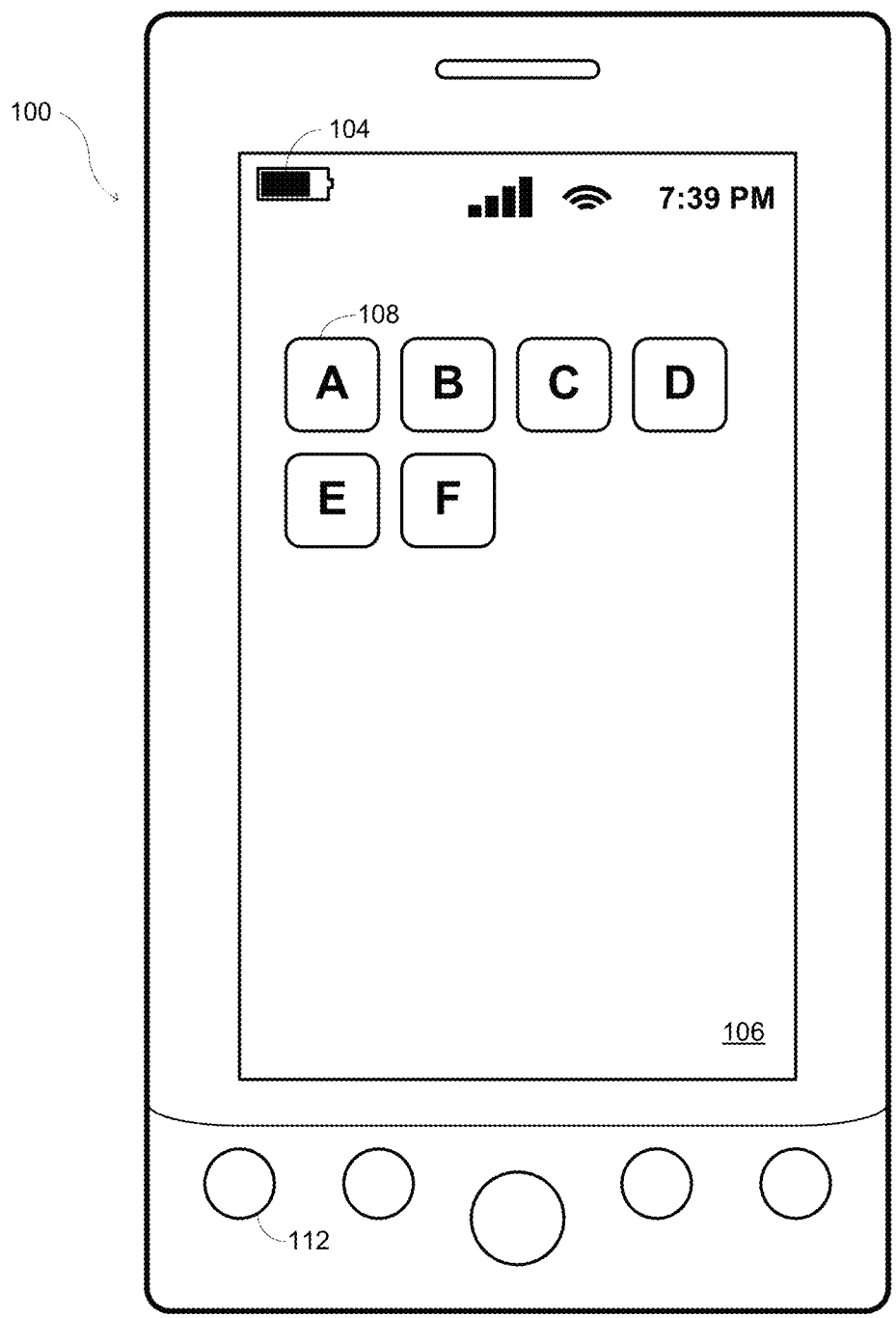
FIG. 1A is a schematic illustration of one example of a mobile communications device with which the invention may be embodied.
Figure 1B:
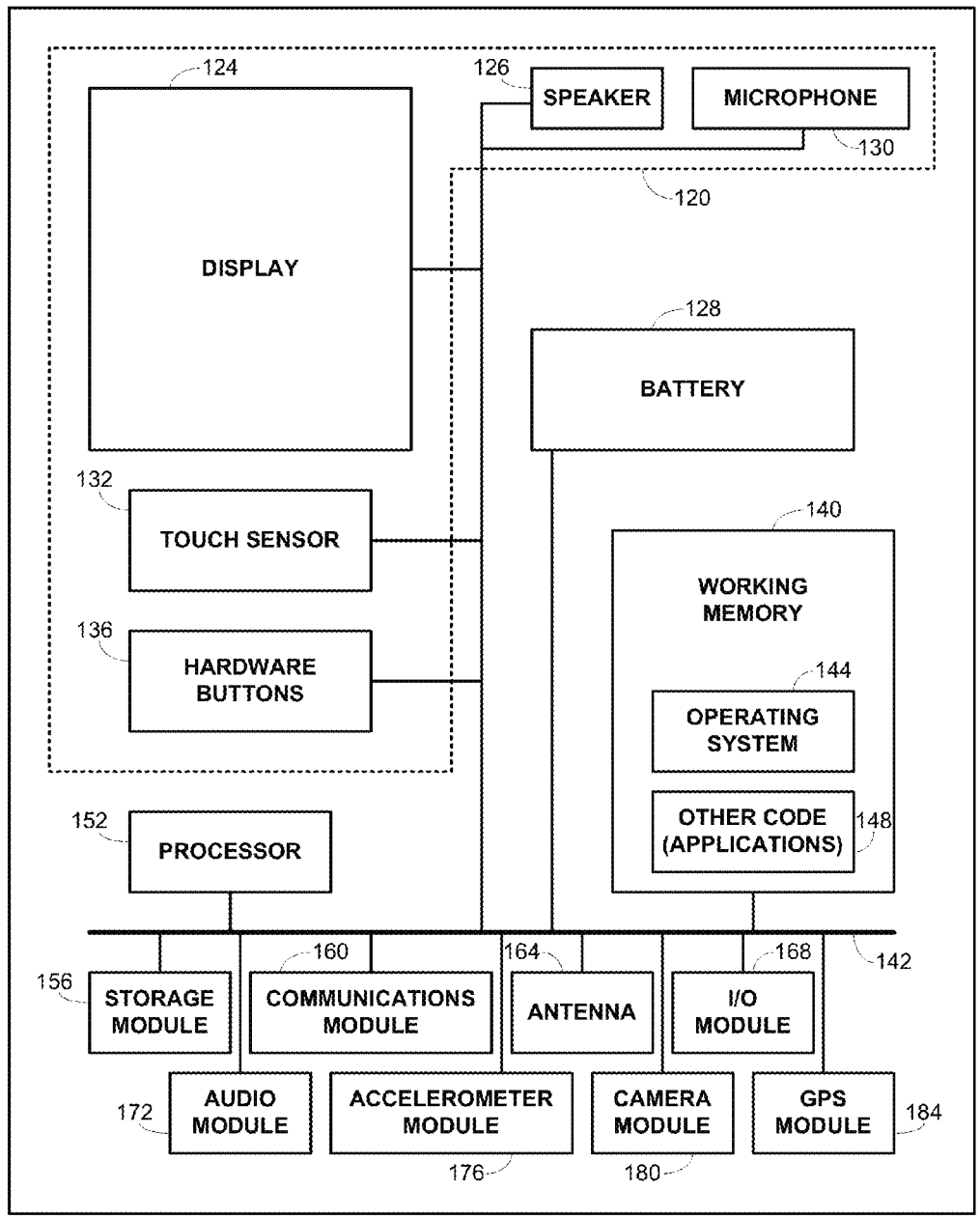
FIG. 1B is a schematic illustration of an internal structure of a mobile communications device with which the invention may be embodied.

For purposes of illustration, FIGS. 1A and 1B provide structural and functional schematic views of a typical mobile communications device 100. The structure shown in FIG. 1A is intended merely to be exemplary since the invention may be embodied not only in any type of mobile communications device, including such devices as mobile telephones, smart phones, pagers, wireless Internet appliances, and the like, but may be embodied in any device that operates by drawing power from a finite but rechargeable source. There are moreover a number of different ways in which users may interact with devices, the example of FIG. 1A including a touchscreen 106 from which a number of applications 108 may be accessed as well as buttons 112. In other devices, keyboards, whether integral with the device, coupled through electrical cables, or presented as virtual keyboards accessed by the touchscreen 106, may be used to interface with the device 100. Similarly, acoustic interactions may be enabled with a speaker and microphone as part of issuing voice commands to the device 100 and receiving responses. The device 100 may also be equipped with communications systems that allow for remote interactions with the device in addition to being used in implementing some of the communications functions of the device 100; examples of such communications systems allow the use of wifi, bluetooth, 3G, and other types of communications protocols known to those of skill in the art. A battery indicator 104 may be included to indicate an overall level of battery resources. A battery indicator of this type is entirely conventional with mobile devices and provides only a very high-level and approximate indication of available battery power.

The functional illustration of FIG. 1B is also intended to be exemplary, with functional components of the device 100 being provided in a generally integrated or separated fashion. While the illustration identifies a number of specific functional components, it is to be understood that alternative devices may lack some of these specific components and may sometimes include other components not specifically described. The methods and systems of the invention are described below in terms of subsystems, each of which may comprise one or may of the components and their interactions with each other, and those methods and systems may be readily adapted to other types of subsystems not specifically described herein.

The illustration of FIG. 1B includes a battery 128 that is coupled with other components of the device 100 through a bus 142 so that each of those other components may draw power from the battery 128 during operation. The components that enable interaction between the device 100 and a user are identified collectively with reference number 120 and include one or more displays 124, one or more touch sensors 132, hardware buttons 136, one or more speakers 126, and one or more microphones 130. The displays 124 allow for visual forms of interaction with user, with input from the user being collected through the touch sensors 132 and/or hardware buttons 136, while the speaker 126 and microphone 130 allow for audio forms of interaction.

Operation of the speakers 126 and microphones 130 may be coordinated with an audio module 172, which is one of several additional modules that may provide different kinds of functionality to the device 100. For instance, a camera module 180 may be interfaced with a camera integral with the device 100 that is used to capture and store images. An accelerometer module 176 may be used to monitor an orientation of the device 100 with respect to gravitational forces. As such, the accelerometer module 176 may conveniently be used to determine whether a display 124 is in a portrait or landscape orientation, and may provide other functionality that relies on knowing the orientation of the device 100. A GPS module 184 may be used to determine a location of the device 100, enabling a wide variety of functions that rely on knowing such a location.

The GPS module 184 is one example of a module that may be comprised by the device 100 that interacts with a communications module 160 by accessing GPS satellite signals. The communications module 160 may additionally be operable to communicate with any of a variety of networks, enabling communication with a cellular network, a wifi network, and the like. Such communications may be coordinated through operation of an antenna 164 to access and generate electromagnetic signals used in communication with the device 100. Other types of communications, notably through electrical cables, may be effect by operation of an input/output module 168 configured for electrical coupling of the device with other devices or peripherals.

All of these and other modules may have their operation coordinated by a processor 152 that interacts with a storage module 156. The processor 152 may be embodied as one or more application-specific integrated circuits ("ASICs"), one or more field-programmable gate arrays ("FGPAs"), or one or more general-purpose processors operative to execute machine-readable instructions in the form of code. Moreover, the processor 152 may include processing acceleration in the form of a digital-signal processor ("DSP") or special-purpose processor.

Software elements are shown as being currently located within working memory 140, including an operating system 144 and other code 148, such as programs to operate the different modules and to implement methods of the invention. It will be apparent to those skilled in the art that substantial variations may be used in accordance with specific requirements. For example, customized hardware might also be used and/or particular elements might be implemented in hardware, software (including portable software such as applets), or both.

Figure 2A:
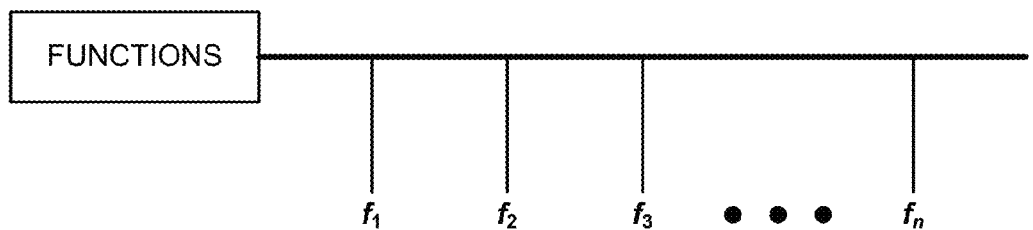
FIGS. 2A and 2B provide illustrations of how functionality and subsystems of mobile communications devices may be related.
Figure 2B:
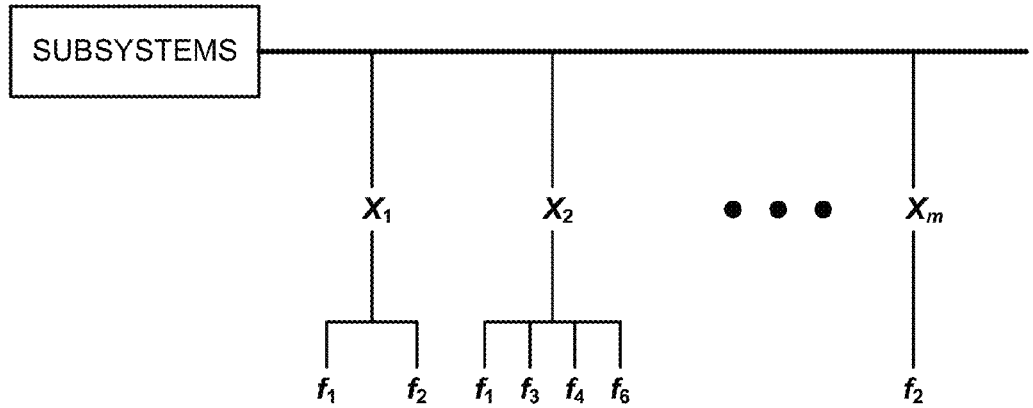

FIGS. 2A and 2B generalize the structure of devices on which the invention may be embodied by noting variations in relationships that may exist between the structural modules and the functionality of the devices. In particular, FIG. 2A shows that any device 100 may be configured to perform one or more functions $f_i$ using subsystems $X_j$ of the device 100, but that there is not necessarily an one-to-one mapping of the functions $f_i$ and the subsystems $X_j$, as shown in FIG. 2B. That is, FIG. 2B shows explicitly that each subsystem $X_j$ may be involved in the performance of any number of functions $f_i$, with the converse also being true, namely that the performance of each function $f_i$ may implicate any number of subsystems $X_j$. This may be illustrated with an example, but is generically true. Consider, for instance, a device 100 having a cellular-telephone function. Such a function may invoke a subsystem of the device 100 that operates the display 124, the speaker 126, the microphone 130, the audio module 172, the communications module 160, and the antenna 164. When the same device 100 is equipped with a data function for receiving a wireless protocol, subsystems that may be involved include the display 124, the communications module 160, and the antenna 164.

Power requirements for each of the functions may accordingly vary considerably and the power requirements for each subsystem invoked by the different functions may additionally vary depending on the function to be performed. Consider a typical mobile communications device, which draws approximately 0.5-1.0 mA when in a standby mode. Activation of the display subsystem 124 may draw about 150-250 mA when backlighting is activated. Activation of a speaker/microphone subsystem may draw about 200-300 mA when activated. A cellular-telephone function may thus draw more power from the battery than a data function, with the both the data and cellular-telephone functions additionally requiring involvement of the communications module 160 and the antenna 164 but only the cellular-telephone function involving the audio module 172.

Further complicating the battery requirements for these different functions is the way in which they are actually used by a user. A cellular-telephone function typically draws on the battery for a greater length of time than does a data function, with data functions typically operating for a time on the order of a few hundred milliseconds while cellular-telephone functions operating for a time period on the order of minutes. In addition, the actual time involved with any function may very much depend on the specific usage patterns of the device user. Some users may engage in relatively brief conversations using the cellular-telephone function while other users have unusually heavy data requirements.

Figure 3:
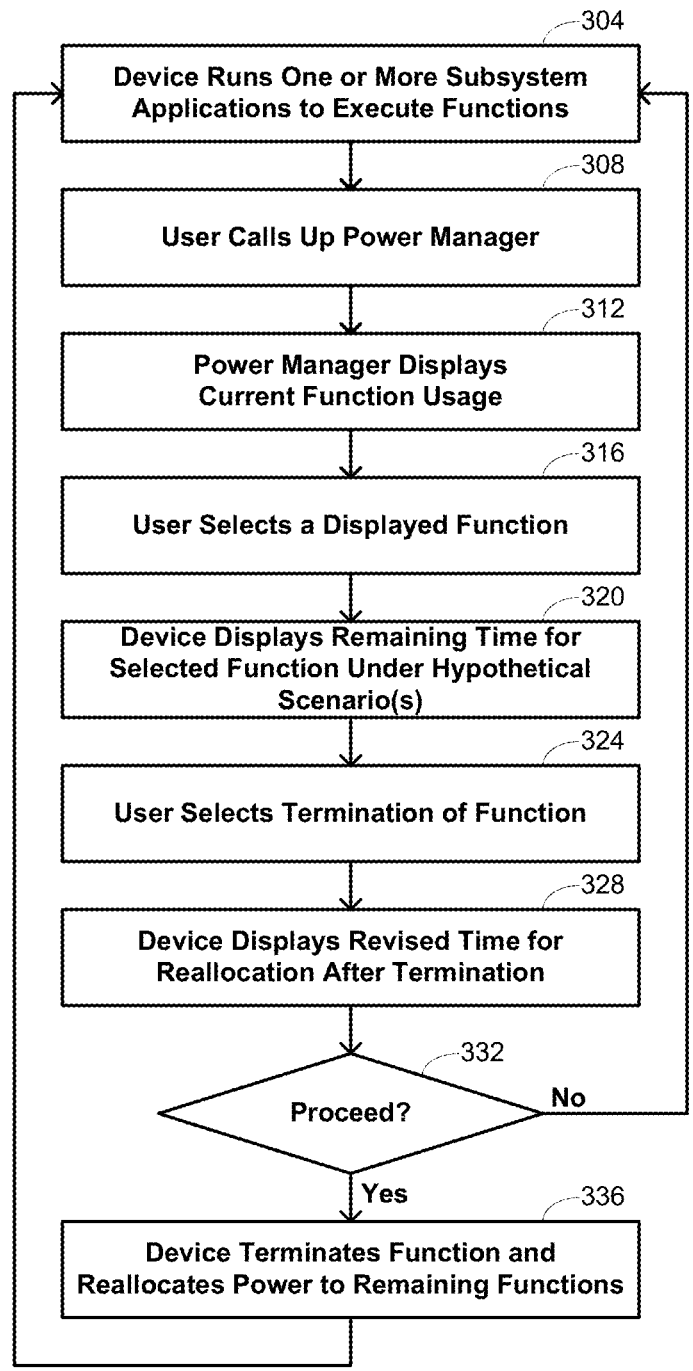
FIG. 3 is a flow diagram summarizing methods of managing power in a mobile communications device according to embodiments of the invention.

Methods of managing power allocations according to embodiments of the invention are illustrated with the flow diagram of FIG. 3, and also with reference to exemplary screens that may be presented to the user as shown in FIGS. 4A-4D. In considering the flow diagram, it is noted that the identification of specific steps in the diagram is not intended to be limiting, nor is the order in which the steps are presented. Specifically, the flow diagram defines one particular embodiment and alternative embodiments may omit some of the steps indicated, may include additional steps that are not identified, and/or may vary the order of some of the steps.

The illustrated embodiment begins with the device running a number of subsystem applications at block 304 to execute functions. The running of such applications may have been initiated by the user, who calls up a power-manager application at block 308 to manage the power allocation for the subsystems. In some instances, the running of subsystem applications may have been initiated automatically by the device itself, but even under such circumstances the user may be given control over the allocation of power resources to the applications with the power-manager application.

Figure 4A:
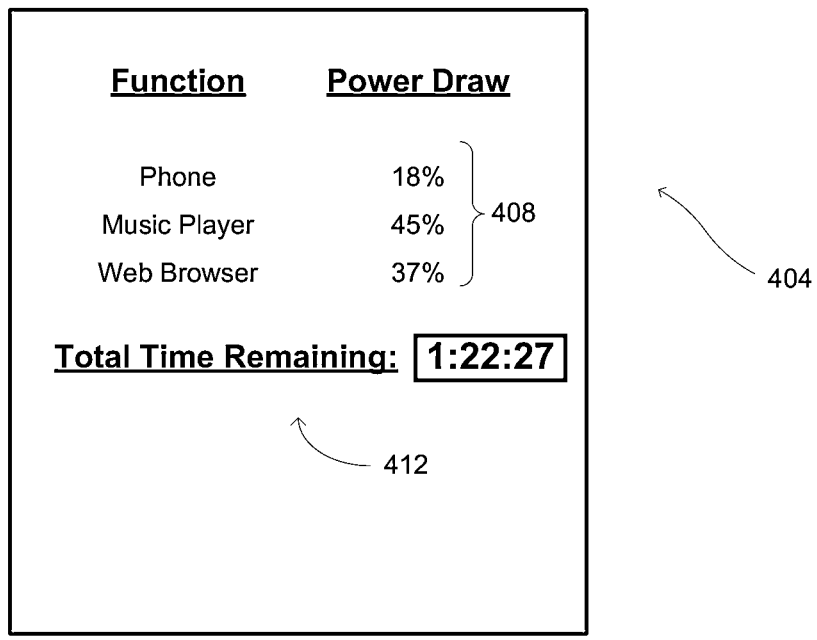
FIGS. 4A-4E provide examples of views that may be displayed on a mobile communications device as part of implementing the methods of FIG. 3.

FIG. 4A provides an illustration of a screen 404 that may be presented to the user in response to calling up the power-manager application. There are many different ways in which power-allocation information may accordingly be presented to the user at block 312, with the specific type and form of the information shown in FIG. 4A merely being one example. In this illustration, the user is presented with information that summarizes the power draw associated with three different functions being executed by the device. Presenting information for functions rather than for subsystems may be more intuitive for the user, but alternative embodiments may present similar information for subsystems, either alternatively or in addition. For instance, with the device executing phone, music player, and web browser functions, subsystems that control the device's display, audio, and communications modules may all be running, but in different combinations to accommodate the functions. While a user could be afforded greater control over power allocation with access to subsystem information, the more highly intuitive nature of function information in the manner show may make its use preferable.

The screen 404 in FIG. 4A is generated by the device through a consideration of power draws from each of the subsystems. Specifically, the device determines how much power is being drawn by each of the subsystems and at what levels to execute the functions. The results of this determination are shown in FIG. 4A with a set 408 of percentages, although other methods of displaying the information may be used in alternative embodiments. The percentage values 408 indicate what fraction of the total current power draw is allocated to each of the functions, allowing a user readily to determine which functions are most power-intensive. Other types of displays might present the information in the form of a histogram, with a series of bars that graphically indicate the relative power draws allocated to each function. Also, some types of displays might use absolute power-draw values rather than percentage values, but each type of display provides some indication to the user of which functions are most demanding on the power resources.

Figure 4B:
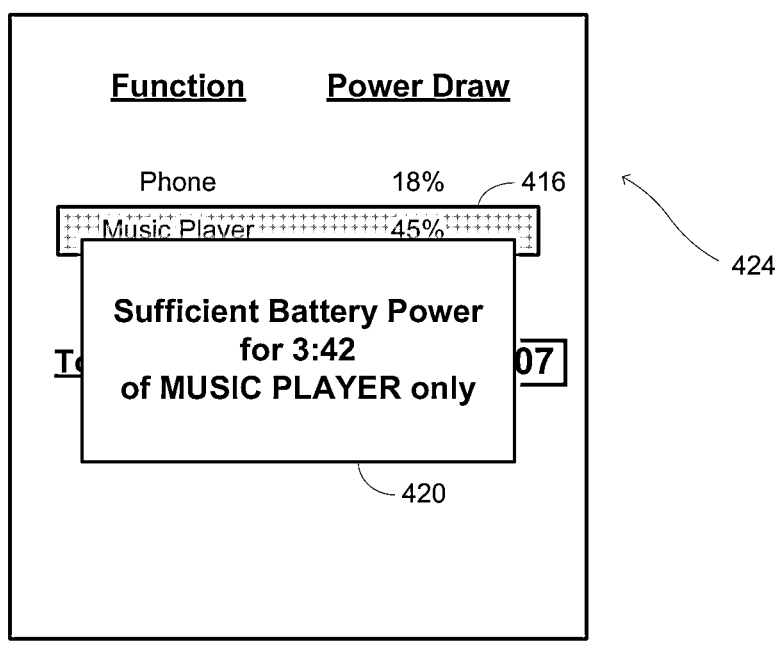

The screen 404 also provides an indication to the user of the total time remaining 412 when power is being drawn at current levels. This total time value is a convenient summary indicium that may be used in combination with other information to allow the user to make decisions about power allocation. For example, when the user selects one of the displayed functions as indicated at block 316 of FIG. 3 and illustrated with FIG. 4B, the device may respond by displaying a screen 424 that shows a comparison time value for that function alone. FIG. 4B illustrates an example in which the user selects the "Music Player" function 416, prompting the device to determine the total time that that function could be executed if it were the only function being executed and to display the results of that determination in a popup box 420. This allows the user to compare the roughly one hour and twenty-two minutes that the device could execute all three functions with the roughly three hours and forty-two minutes it could execute the "Music Player" function without having also to execute other functions. As the user scrolls over the listing of different functions, the device may similarly show the total time that would be available to the other functions, allowing a comparison readily to be made.

Figure 4C:
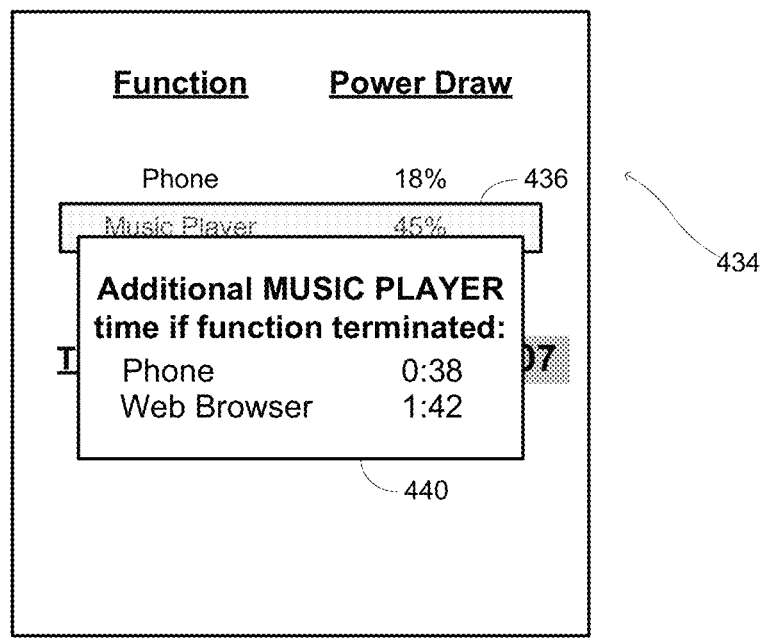

This is one example of a more general step in the method of FIG. 3, indicated at block 320, in which the device displays the remaining time for the selected function under hypothetical scenarios. In other embodiments, information may be displayed for other types of hypothetical scenarios. For instance, in response to the selection of one of the displayed functions, the device might instead display the additional time that might become available for the selected function if one of the other functions were terminated. This is illustrated in FIG. 4C with another screen 434, again for a selection 436 of the "Music Player" function. The popup 440 in this embodiment informs the user that the "Music Player" function could have its maximum time extended by thirty-eight minutes if the "Phone" function were terminated and by an hour and forty-two minutes if the "Web Browser" function were terminated. Of course, other functions being executed might also have their time extended.

There are still other ways in which the user may be informed of the impact of terminating one of the functions, each of which is intended to provide the user with information to decide whether to select termination at block 324 of FIG. 3. In response to such a selection, the device might simply respond by terminating the function and reallocating power resources, but in some embodiments, such as those indicated in the drawing, it may instead require confirmation from the user after displaying revised times for reallocation after termination, as indicated at block 328.

Figure 4D:
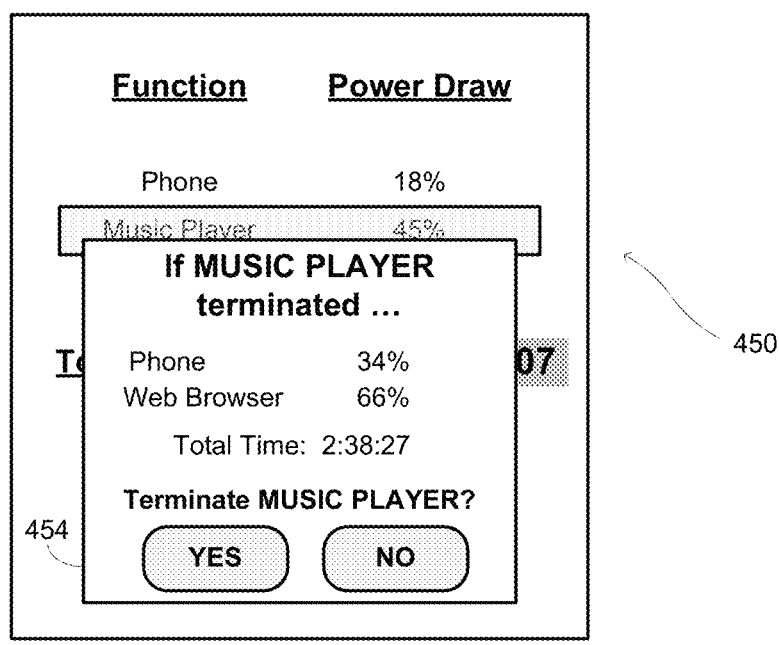
Figure 4E:

FIG. 4D provides an example of screen 450 that may be displayed at block 328 to inform the user of the effect of terminating a function, in this case the "Music Player" function. The popup 454 indicates that if the "Music Player" function is terminated, a reallocation of battery resources will provide sufficient power for the "Phone" and "Web Browser" functions to operate for some additional two hours and thirty-eight minutes, with 34% of the resources being allocated to the "Phone" function and 66% of the resources being allocated to the "Web Browser" function. It also provides a mechanism for the user to confirm, as indicated at block 332 of FIG. 3 that the user wishes to proceed with the termination. At block 336, the device accordingly terminates the function and proceeds with the reallocation. A subsequent call of the power manager may then result in a screen like that shown in FIG. 4E, with the screen 460 displaying that new allocation.

The examples described above illustrate relatively simple embodiments in which the power manager provides the user with a mechanism for monitoring power allocations by the device and for terminating certain functions so that those power allocations may be redefined. In more complex embodiments, the user may be afforded even greater control over power allocations. Rather than terminate a particular function, such embodiments may permit the user to change the power allocation for a particular function. For instance, in the example described in detail above, the user might be given the ability to reduce the power allocation to the "Music Player" to limit it to thirty minutes of execution time. Once the reassigned allocation is expended, the "Music Player" function would terminate automatically or the user would be provided with a reminded and an ability to perform yet another reallocation. This has the advantage of allowing the user to continue with execution of a function, but limiting its execution time so that the user need not continually monitor the time that it has been used because the device will accommodate the user's wishes automatically.

A variant of these embodiments includes an embodiment in which the time for a particular function is increased with the power manager rather than decreased. Rather than limit the "Music Player" to thirty minutes of execution time to free up battery resources for other functions, the user might increase the time of the "Phone" function to two hours, thereby guaranteeing that there will be sufficient resources to complete the "Phone" function. Allocations for other functions being executed are accordingly reduced to accommodate the "Phone" allocation. If the user terminates the "Phone" function before the full allocation is used up, the power manager may be used again to deallocate the "Phone" application and apply the recovered battery resources to another function.

The examples discussed thus far have also considered instances in which the total battery resources are used for the particular functions, but in other embodiments portions of the battery resources may be reserved for future execution of functions, including both defined and undefined functions. An example of a defined function is an emergency function in which a portion of the battery resources are set aside as unavailable for user-defined functions so that the device maintains sufficient battery resources for a user to make an emergency call, send an emergency text message, or the like. This kind of preallocation may be tied to particular emergency functions of the device, such as where the emergency function can only be used to call a preprogrammed emergency number (e.g., "911"), ensuring that the emergency allocation is not subject to misuse.

Reserving battery resources for undefined functions amounts to the user determining with the power manager that a certain level of resources should be set aside for as-yet unspecified functions. This enables the user to limit the execution of currently running functions with a constraint that ensures that desired time limits are not exceeded, thereby freeing the user to use the functions without actively needing to monitor the usage time.

FIGS. 5A-5C provide an illustration of how battery resources may be used and affected by the power manager. Each of these drawings represents the battery resources with a bar, partitioning the bar according to how the resources are allocated to certain subsystems. FIG. 5A illustrates an example of static allocation of battery resources 500 in which every portion of the battery resources 500 are preallocated to certain subsystems, with the battery resources 500 in this example having an emergency allocation 504 and allocations 508, 512, and 516 respectively to subsystems $X_1$, $X_2$, and $X_3$. Such a static allocation may be determined according to past usage. There are a number of techniques that may be used, one of which simply assigns the relative static allocations according to actual usage of the different subsystems. For instance, suppose that the past usage of subsystem $X_k$ is denoted by $U_k$, with the total usage of all subsystems being $U = \Sigma_k U_k$, and the fraction of the total static allocations for each subsystem $X_k$ denoted by $\alpha_k$ with $\Sigma_k \alpha_k \equiv 1$. When a particular function is called and results in usage for subsystems $X_1, X_2, \ldots, X_m$ denoted by $\Delta U_1, \Delta U_2, \ldots, \Delta U_m$, the reallocation of static allocations at may proceed by applying the following:

$$U \rightarrow U' = U + \sum_m \Delta U_m$$

$$\alpha_m \rightarrow \alpha'_m = \frac{\alpha_m U + \Delta U_m}{U'}.$$

Such a reallocation preserves the constraint that $\Sigma_k \alpha_k \equiv 1$ but changes the specific allocations to different subsystems in a direct way that accounts for actual usage of those subsystems. This is a relatively simple method of performing the reallocation and those of skill in the art will understand that more complex methods may be used in alternative embodiments. For instance, environmental factors such as ambient temperature measurements could be taken into account so that the scope of the reallocation is reduced if the temperature was unusually low, resulting in an unusually high usage of battery resources to complete the function. Similar adjustments may be included for any of a host of other factors that affect the actual usage, including such factors as the location of power stations, the number of threads running, and other factors described above.

As explained in connection with FIG. 2, multiple functions may involve use of the same subsystems so that while the static allocation ideally approximates usage patterns over time, the actual usage of the device at a given time may map imperfectly to the static allocation. This is illustrated in FIG. 5B for an example in which the three subsystems $X_1$, $X_2$, and $X_3$ are involved in executing a plurality of functions. The stippled portions of the drawing 524, 528, and 532 indicate those portions of the allocation that will be exhausted when the functions being executed naturally terminate. As seen in FIG. 5B, the particular usage of battery resources 500' is constrained in this example by the static allocation to subsystem $X_2$ 512. This is because each of the functions being executed requires the involvement of subsystem $X_2$, such as in an embodiment where subsystem $X_2$ is a display subsystem that is used by each of the "Phone," "Music Player," and "Web Browser" functions. Exhausting the resources allocated to $X_2$ 512 prevents any of those functions from continuing execution even where other subsystems $X_1$ and $X_3$ may continue to have unexhausted battery resources 508 and 516 allocated to them.

When the user terminates one of the functions that relied heavily on $X_2$, the change results in the illustration of FIG. 5C, with the usage of battery resources 500" now being constrained by the static allocation to subsystem $X_1$. The portions of the static allocations to $X_1$ 508, $X_2$ 512, and $X_3$ 516 are identified in the drawing by reference numbers 524', 528', and 532' respectively. By terminating the function, resources allocated to $X_2$ 512 have been freed up sufficiently to allow functions that rely less heavily on subsystem $X_2$ to better exploit the resources 508 and 516 allocated to $X_1$ and $X_3$.

These types of constraints are alleviated in embodiments that use dynamic allocation, which is described in detail in the related application. With perhaps the exception of the static preallocation of battery resources for an emergency function, dynamic allocation assigns battery resources for use by subsystems at the time individual functions are called. While those allocations may result in certain battery resources being reserved for use by the functions according to past usage patterns, the dynamic allocation generally results in fewer constraints like those illustrated with FIGS. 5B and 5C. Furthermore, the functionality of the power manager, allowing the user to terminate functions and thereby free allocated resources for use by other functions permits greater flexibility by the user not only in monitoring how the limited resources are used but also in controlling how those resources are used.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of managing battery resources of an electronic device having a battery, a display in communication with the battery, two or more device subsystems in communication with the battery, and a user interface in communication with two or more device subsystems, the method comprising:
   displaying a power manager application screen, on the display, with an indication of usage of the battery resources by the two or more device subsystems in executing a function by the electronic device, wherein the power manager application screen presents a power draw for the function;
   receiving, with the interface, a user directive to reallocate the usage of the battery resources; and
   reallocating the usage of the battery resources in accordance with the user directive, wherein presenting the indication of usage of the battery resources comprises presenting an estimated time to depletion of the battery resources in accordance with a hypothetical change in execution parameters of a first plurality of functions.

2. The method recited in claim 1, wherein the indication of usage of the battery resources is a window.

3. The method recited in claim 2 wherein presenting the indication of usage of the battery resources comprises presenting an estimated time to depletion of the battery resources by a second plurality of functions by the device executing different from the first plurality of functions.

4. The method recited in claim 2 wherein presenting the indication of usage of the battery resources comprises presenting an estimated time to depletion of the battery resources in accordance with a hypothetical change in execution parameters of the first plurality of functions.

5. The method recited in claim 1 wherein presenting the indication of usage of the battery resources comprises presenting an indication of relative usage of the battery resources separately by two or more functions.

6. The method recited in claim 5 wherein receiving the user directive comprises receiving a user directive to terminate execution of at least one of the two or more functions.

7. The method recited in claim 6 wherein reallocating the usage of the battery resources comprises terminating execution of the at least one of the two or more functions in accordance with the user directive.

8. The method recited in claim 7 wherein reallocating the usage of the battery resources further comprises:
   identifying unused portions of the battery resources allocated to the terminated function;
   deallocating the identified portions of the battery resources; and
   allocating the deallocated portions of the battery resources to at least one other of the two or more functions.

9. The method recited in claim 5 wherein reallocating the usage of the battery resources comprises defining a time limit for execution for at least one of the two or more functions.

10. The method recited in claim 1 wherein the usage of the battery resources is performed by the device in accordance with a static allocation of battery resources.

11. The method recited in claim 1 wherein the usage of the battery resources is performed by the device in accordance with a dynamic allocation of battery resources.

12. The method recited in claim 1 wherein the electronic device comprises a handheld communications device.

13. An electronic device comprising:
   a processor;
   a battery;
   a display in communication with the battery and the processor;
   two or more device subsystems in communication with the battery and the processor; and
   a user interface in communication with the processor and two or more device subsystems, wherein the processor executes a power manager application, the power manager application has:
   instructions to present on the display an indication of usage of the battery resources by the two or more device subsystems in executing a plurality of functions by the electronic device, wherein the power manager application presents a power draw for the plurality of functions, wherein presenting the indication of usage of the battery resources comprises presenting an estimated time to depletion of the battery resources in accordance with a hypothetical change in execution parameters of the plurality of functions;
   instructions to receive, with the interface, a user directive to reallocate the usage of the battery resources; and
   instructions to reallocate the usage of the battery resources in accordance with the user directive.

14. The electronic device recited in claim 13 wherein the instructions to present the indication of usage of the battery resources comprise instructions to present a power manager application screen to display the indication of usage of the battery resources.

15. The electronic device recited in claim 14 wherein the instructions to present the indication of usage of the battery resources comprise instructions to present an estimated time to depletion of the battery resources by executing a second set of two or more functions by the device different from the plurality of functions.

16. The electronic device recited in claim 14 wherein the instructions to present the indication of usage of the battery resources comprise instructions to present an estimated time to depletion of the battery resources in accordance with a hypothetical chance in execution parameters of the plurality of functions.

17. The electronic device recited in claim 13 wherein the instructions to present the indication of usage of the battery resources comprise instructions to present an indication of relative usage of the battery resources separately by each of the plurality of functions.

18. The electronic device recited in claim 13 wherein the instructions to receive the user directive comprise instructions to receive a user directive to terminate execution of at least one of the plurality of functions.

19. The electronic device recited in claim 18 wherein the instructions to reallocate the usage of the battery resources comprise instructions to terminate execution of the at least one of the plurality of functions in accordance with the user directive.

20. The electronic device recited in claim 19 wherein the instructions to reallocate the usage of the battery resources further comprise:
   instructions to identify unused portions of the battery resources allocated to the terminated at least one of the plurality of functions;
   instructions to deallocate the identified portions of the battery resources; and
   instructions to allocate the deallocated portions of the battery resources to at least one other of the plurality of functions.

21. The electronic device recited in claim 13 wherein the instructions to reallocate the usage of the battery resources comprise instructions to define a time limit for execution for at least one of the plurality of functions.

22. The electronic device recited in claim 13 wherein the usage of the battery resources is performed by the device in accordance with a static allocation of battery resources.

23. The electronic device recited in claim 13 wherein the usage of the battery resources is performed by the device in accordance with a dynamic allocation of battery resources.

24. The electronic device recited in claim 13 wherein the electronic device comprises a handheld communications device.

* * * * *